(12) United States Patent
Maile et al.

(10) Patent No.: US 7,597,612 B2
(45) Date of Patent: Oct. 6, 2009

(54) DEVICE AND METHOD OF CLOSED-LOOP LEVEL CONTROL AND FOR THE CONTROLLED EVACUATION OF PASTE MASSES

(75) Inventors: Bernd Maile, Oggelshausen (DE); Martin Staudenrausch, Biberach (DE)

(73) Assignee: Albert H. Handtmann Maschinenfabrik GmbH & Co. KG, Biberach (DE)

(*) Notice: Subject to any disclaimer, the term of this patent is extended or adjusted under 35 U.S.C. 154(b) by 0 days.

(21) Appl. No.: 11/710,113

(22) Filed: Feb. 23, 2007

(65) Prior Publication Data
US 2007/0254570 A1    Nov. 1, 2007

(30) Foreign Application Priority Data
Mar. 9, 2006    (EP) ................... 06004867

(51) Int. Cl.
*A22C 11/00* (2006.01)
(52) U.S. Cl. ....................................... 452/30
(58) Field of Classification Search ............ 452/21–26, 452/30–32, 35–37, 40–44, 46–48, 51; 141/80, 141/81, 114, 249, 258, 260, 270, 284; 99/467, 99/472, 473
See application file for complete search history.

(56) References Cited

U.S. PATENT DOCUMENTS

| | | | |
|---|---|---|---|
| 3,166,786 A | | 1/1965 | Thompson |
| 3,742,556 A | * | 7/1973 | Beasley ................... 452/41 |
| 4,427,040 A | | 1/1984 | Taylor |
| 4,787,826 A | | 11/1988 | Schnell et al. |
| 5,097,876 A | * | 3/1992 | Lagares .................. 141/249 |
| 5,364,251 A | * | 11/1994 | Simonsen ................ 418/220 |
| 6,234,890 B1 | * | 5/2001 | Passoke et al. ........... 452/30 |
| 6,321,642 B1 | * | 11/2001 | Ou-Young ............... 99/494 |
| 6,767,277 B2 | * | 7/2004 | Henry et al. ............. 452/30 |
| 6,939,215 B2 | * | 9/2005 | Schnell et al. ........... 452/30 |
| 7,381,122 B2 | * | 6/2008 | Lagares Coromines ... 452/30 |

FOREIGN PATENT DOCUMENTS

| | | |
|---|---|---|
| DE | 459 031 | 9/1930 |
| DE | 42 27 621 A1 | 2/1994 |
| DE | 44 17 906 A1 | 11/1995 |
| DE | 1 040 758 A1 | 10/2000 |
| EP | 0 198 300 A2 | 10/1986 |
| EP | 0 569 959 A1 | 11/1993 |
| EP | 1 051 912 A1 | 11/2000 |
| EP | 1 502 509 A1 | 2/2005 |
| EP | 06004867.5 | 3/2006 |
| GB | 998572 | 7/1965 |
| GB | 1 380 082 A1 | 1/1975 |

* cited by examiner

*Primary Examiner*—Thomas Price
(74) *Attorney, Agent, or Firm*—Marshall, Gerstein & Borun LLP

(57) ABSTRACT

A method and a device for the closed-loop level control and for the controlled evacuation of paste mass, in particular sausage meat, wherein the vacuum hopper comprises an inlet for feeding paste mass, in particular sausage meat, as well as an outlet for ejecting the paste mast an inlet valve, which is arranged at the inlet, wherein a negative pressure can be produced in the vacuum hopper. In order to influence the degree of evacuation in the inflowing mass, the inlet valve comprises in the open state an inlet gap S for the paste mass, the gap height (h) of which can be controlled to influence the degree of evacuation of the paste mass.

27 Claims, 4 Drawing Sheets

DEVICE AND METHOD OF CLOSED-LOOP LEVEL CONTROL AND FOR THE CONTROLLED EVACUATION OF PASTE MASSES

CROSS-REFERENCE TO RELATED APPLICATION

The present application claims the benefit of priority of European Patent Application No. 06 044 867.5 filed on Mar. 9, 2006. The entire text of the priority application is incorporated herein by reference in its entirety.

FIELD OF THE DISCLOSURE

The disclosure relates to a vacuum hopper for sausage production, a vacuum filler comprising a vacuum hopper of this nature as well as a method for the closed-loop level control and for the controlled evacuation of paste masses. The disclosure also relates to an inlet valve which can be used in the vacuum hopper.

BACKGROUND OF THE DISCLOSURE

Normally, during sausage production filling machines are used, the hoppers of which are open at the top. Here, the sausage meat situated in the hopper is transported to the center by a circumferential feeder curve. In the conveying mechanism located at the outlet of the hopper a negative pressure is produced by a vacuum pump in order to extract air and thus also oxygen from the sausage meat, so that the shelf life of the sausage is extended. On the other hand, a pressure difference Δp to the surface of the hopper charge arises in the conveying mechanism due to the negative pressure such that the paste mass is pressed into the conveying mechanism chamber by the atmospheric air pressure.

The evacuation of the sausage meat can only take place to a restricted extent using this method. In order to extract more air and thus oxygen from the sausage meat, closed hoppers are employed, so-called vacuum hoppers, wherein a negative pressure is produced already in the hopper. Through the negative pressure the paste mass to be charged is pressed out of a reservoir by the higher pressure prevailing there into the closed hopper. Alternatively, the charging of the vacuum hopper can also take place under pressure with an additional pump. During and after the mass has flown into the closed evacuated hopper, air content near to the surface, such as for example air bubbles, are opened up and drawn off from the paste filling mass, i.e. a certain evacuation of the inflowing mass occurs.

The filling level in the hopper is here normally acquired using a level sensor. Depending on the filling level the valve on the feed tube is opened or closed (two-step control). The purpose of this control is solely the level control of the hopper content.

However, the known techniques exhibit the disadvantage that the inflow of the mass takes place more or less abruptly and uncontrollably. Also, the degree of evacuation of the inflowing mass is not optimal due to the principle, because the air content in the mass remote from the surface remains.

SUMMARY OF THE DISCLOSURE

Against this background the object of the disclosure is to provide a device and a method which with an evacuated hopper for the inflowing mass, enable the degree of evacuation to be influenced or controlled in addition to the closed-loop level control.

In view of the fact that according to the disclosure the height of the inlet gap on the inlet valve can be controlled by a closed-loop control device, the specific degree of evacuation and thus the remaining amount of air or remaining oxygen in the paste mass can be influenced and controlled. Thus, according to the disclosure the thinnest mass cross-section possible can be achieved in the inflow region. Therefore, all the enclosed air content is near to the surface and can thus be easily opened up and drawn off. The degree of evacuation depends amongst other effects on the mass cross-section and thus on the inlet gap height.

Thus according to the disclosure the inlet gap on the inlet valve of the vacuum hopper can be controlled for the closed-loop level control and for the controlled evacuation of the paste mass. The inflow of the paste mass no longer occurs abruptly or uncontrolled, but rather controlled and can, for example, be adapted to the filling capacity of the conveying mechanism, to the product properties, such as for example to the air content of the paste mass before inflow into the vacuum hopper, wherein the closed-loop control of the valve no longer occurs via a two-step control, but rather via a multi-step control or proportional control. The air content of the end product can thus be specifically influenced.

Preferably the disclosure comprises a closed-loop control device for the control of the gap height in dependence of the compressibility or of the air content of the paste mass before the inlet valve and/or after the outlet and/or between the inlet valve and outlet (e.g. in the vacuum hopper) and of level parameters. This means that by changing the air content in the paste mass also the compressibility is changed and the height of the inlet gap is changed in dependence of this quantity in order, for example, to achieve a certain air content. If, for example, a large amount of at is enclosed in the paste mass, then the gap must be selected as small as possible so that the enclosed air bubbles can be easily opened up. The control of the gap S occurs however also in dependence of level parameters. The level parameters include, for example, the filling capacity of the paste mass through the inlet into the vacuum hopper and/or the filling level in the hopper and/or the conveying capacity of a conveying mechanism which is arranged at the outlet of the vacuum hopper.

A control device of this nature for controlling the gap height controls the gap height, for example, in dependence of at least one parameter from the following group: compressibility or air content of the paste mass before the inlet valve, compressibility or air content of the paste mass after the outlet (e.g. on the outlet of a following conveying mechanism) or in the vacuum hopper, filling capacity of the paste mass in the vacuum hopper, amounts of charges for the mass, pressure difference before and after the inlet valve, conveying capacity of a conveying mechanism which is arranged on the outlet of the vacuum hopper, as well as the filling level of the paste mass in the vacuum hopper, temperature of the paste mass, viscosity of the paste mass.

According to the disclosure the inlet gap has, for example, a circular or elliptical cross-section. Also other closed cross-sectional shapes are conceivable.

According to the disclosure the valve on the inlet comprises a valve face and a baffle situated opposite, wherein the distance between the face and baffle gives the gap height. Thus, the inlet valve according to the disclosure can be realised in an economical and simple manner.

According to the disclosure the inlet valve comprises a drive for the baffle for setting the gap height. This drive facilitates an exact setting of the corresponding baffle position or gap height. An embodiment with a fixed baffle and a valve face which is adjustable using a drive is also conceivable.

According to a preferred embodiment, the diameter of the baffle is greater than the diameter of the valve face or valve opening. The baffle is thus preferably formed such that the paste mass passes downwards or diagonally downwards, i.e. in the direction of the outlet of the vacuum hopper. Through the diversion of the filling mass downwards, especially with lesser viscous filling masses, the filling level is better controlled, because the sausage meat does not splash so much on the lid and the hopper wall on entering the hopper.

A baffle of this nature is, for example, formed such that it includes a recess on the side facing the valve face, which comprises a section sloping or diagonally sloping downwards from the central axis of the inlet valve at least in the outer region of the inlet gap.

At this section the paste mass can then be passed in the direction of the outlet.

A recess of this nature can, for example, exhibit essentially a concave shape or can, for example, run in a ring shape about the central axis of the valve.

Preferably, the inlet in the upper section of the vacuum hopper is formed in the shape of a feed tube, the open end of which protrudes into the hopper and faces upwards, wherein the baffle is situated opposite the open end.

Preferably the vacuum hopper comprises a device for determining the air content or for determining the compressibility before the inlet valve and/or after the outlet of the hopper, e.g. in the conveying mechanism. If a device of this nature is provided for determining the air content or for determining the compressibility, the measured values can be passed to the closed-loop control device, wherein then, for example, the control of the inlet gap can take place using the measured values. Furthermore, the vacuum hopper can comprise a level sensor. The vacuum hopper can furthermore also comprise a pressure sensor before and/or after the inlet valve. Additional pressure sensors can be arranged before, in and after the conveying mechanism.

A vacuum filler according to the disclosure also comprises a conveying mechanism, which ejects the paste mass from the outlet of the vacuum hopper and pushes it into a filling tube in order to fill sausages with the paste mass, and furthermore a vacuum filler of this nature comprises a vacuum pump to produce a negative pressure of various levels in the vacuum hopper and, where applicable, also in the conveying mechanism.

With the method according to the disclosure a gap control is executed, wherein the gap height of the inlet gap is controlled such that it is as large as necessary for the level control, but is also as small as is required for the control of the degree of evacuation.

According to the disclosure the geometry of the valve opening is preferably such that the opening gap, i.e. the inlet gap, is as long as possible, i.e. that the feed tube exhibits a diameter as large as possible so that sufficient mass can be fed, although the height of the gap S is to be maintained as small as possible.

The inlet valve for controlling the entry of paste mass in a vacuum hopper comprises a baffle situated opposite a valve face, wherein the baffle is formed such that it diverts the paste mass in a direction opposite or diagonal to the entry direction. This form of baffle leads to a deviation of the filling mass, for example, downwards, wherein on one hand especially with lesser viscous filling masses, the filling level can be better controlled, because the sausage meat does not splash so much on the lid and the hopper wall on entering the hopper.

In particular the paste mass is guided at an angle of approximately 100° to 180° with respect to the entry direction or with respect to the central axis of the inlet valve.

According to a preferred embodiment the baffle comprises on a side facing the valve face a recess, which at least in the outer region of the inlet gap comprises a section sloping diagonally downwards from the central axis of the inlet valve.

According to a preferred embodiment, the diameter of the baffle is greater than the diameter of the valve face.

The recess can exhibit essentially a concave shape or however a ring shape about the central axis of the valve.

BRIEF DESCRIPTION OF THE DISCLOSURE

The disclosure is explained in more detail in the following with reference to the following figures.

DETAILED DESCRIPTION OF THE DISCLOSURE

Figure 1:
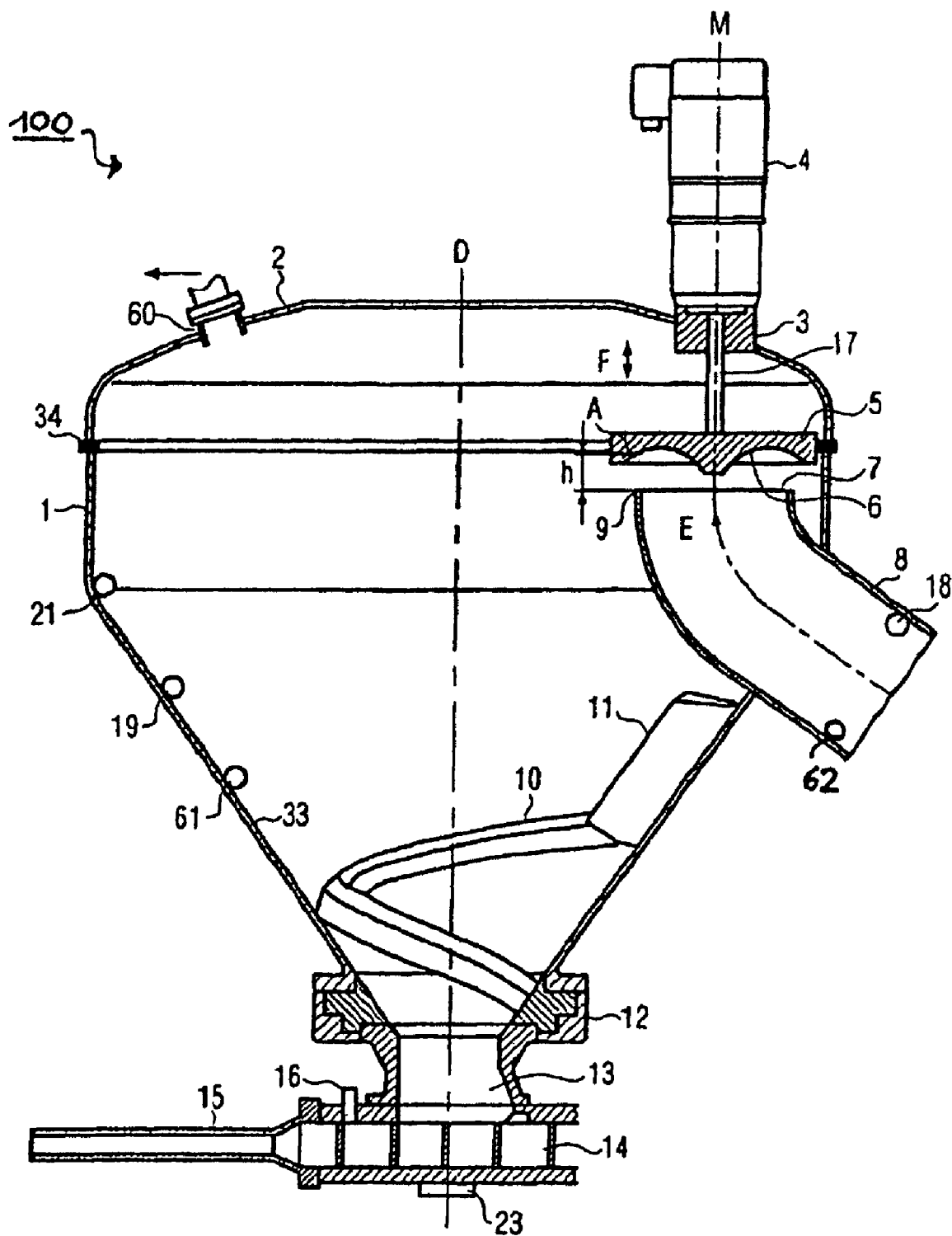
FIG. 1 shows a schematic section through a vacuum filler according to the disclosure.

FIG. 1 shows schematically a vacuum filler 100 according to this disclosure. The vacuum filler 100 comprises a vacuum hopper 1, consisting of a hopper 33 and a lid 2. The hopper 33 and the lid 2 are connected together vacuum-tight via a seal 34, e.g. here a sealing ring. The vacuum hopper 1 comprises an inlet 7 for feeding a paste mass from a reservoir which is not illustrated via the feed tube 8. The hopper 1 also comprises at the lower end, i.e. at the end opposite the lid 2, an outlet 13 for the paste mass. The paste mass situated in the hopper is here conveyed to the center by a circumferential feeder curve 10. The feeder curve 10 here comprises a scraper 11. The feeder curve is in a known manner supported for rotation about the central axis D in the bearing 12 and is rotated in a known manner about the axis D with the aid of a drive which is not illustrated. The scraper 11 here lies adjacent to the interior wall of the hopper 1.

At the outlet 13 a conveying mechanism is arranged which conveys the paste mass from the vacuum hopper 1 into a filling tube 15. Then in the known manner, the paste mass, such as for example the sausage meat, is pushed via the filling tube 15 into the sausage casings provided.

In the closed vacuum hopper 1 a negative pressure is produced using a vacuum pump 23, which is only shown schematically here. This occurs, for example, via a separate vacuum connection 60. Thus, air and oxygen can be extracted from the sausage meat, wherein the shelf-life of the finished product is extended. The air content is also decisive for the cut appearance and biting texture of the finished product. The negative pressure in the vacuum hopper 1 also has the advantage that the paste mass to be filled from the reservoir is pressed or pulled into the closed vacuum hopper 1 by the normal pressure prevailing in the reservoir. Alternatively, the charging of the vacuum hopper can also take place supported by an additional pump or under pressure.

In the conveying mechanism 14 a negative pressure can also be produced using a vacuum pump 23 to additionally extract air and thus oxygen from the paste mass, i.e. from the sausage meat. The absolute pressure in the conveying mechanism is lower or equal to the pressure in the vacuum hopper so that the paste mass is pressed out of the vacuum hopper into the conveying mechanism chamber by the negative pressure in the conveying mechanism 14. Additional mechanical support for the transfer of the paste mass into the conveying mechanism is conceivable, for example, using a screw conveyor.

Figure 5:
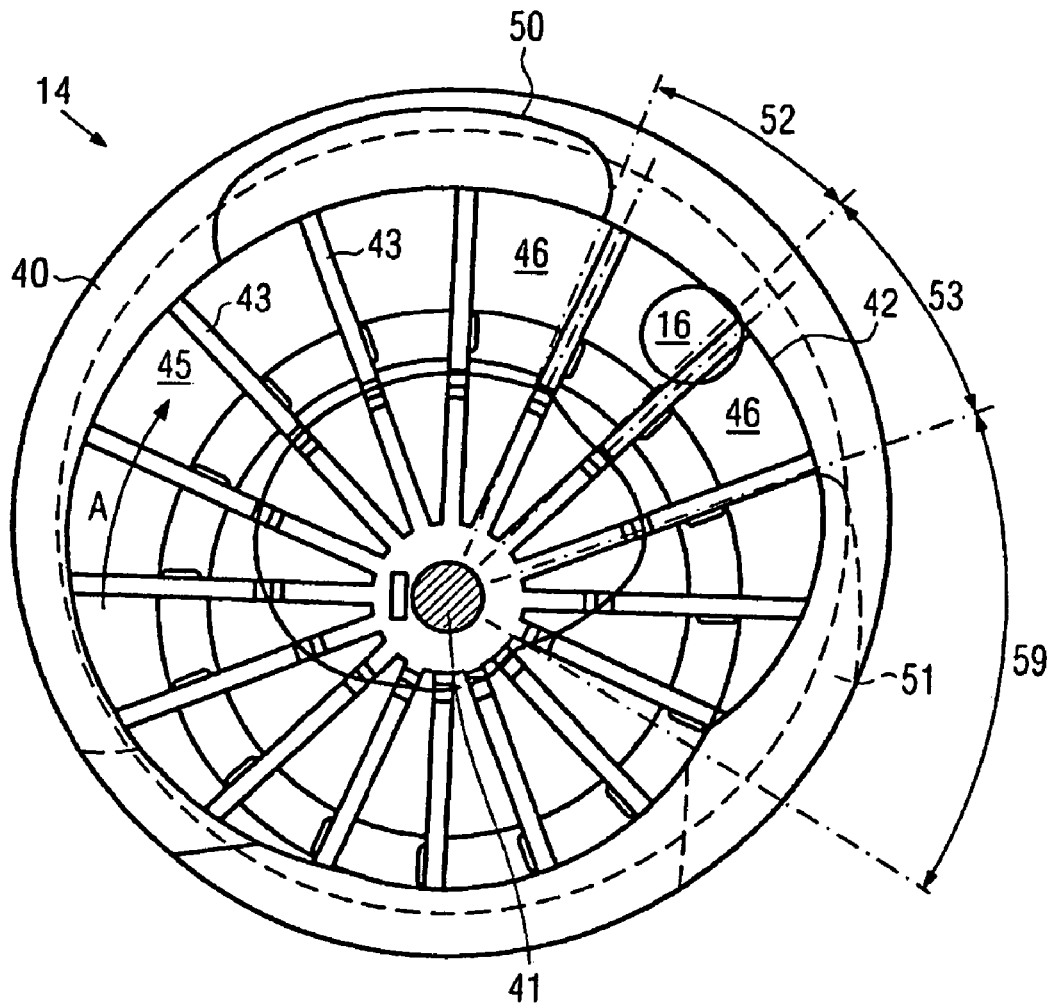
FIG. 5 shows a section through a vane pump, as it can be used for the conveying mechanism for the disclosure.

An example of a conveying mechanism 14 of this nature is illustrated in FIG. 5. FIG. 5 shows a generally known vane pump as is described in more detail in EP 1040758 B1 or in DE 4227621 A1. As can be seen from FIG. 5, the vane pump consists of a pump housing 40 and a rotor arranged eccentrically in it, which can be rotated, with a pump shaft 41. In the rotor, vanes 43, supported for radial movement, are arranged, which form conveying cells 46 with the wall 42 of the pump housing 40, the bottom 45 and the lid (not illustrated) of the housing and the outer surface of the rotor 41, mutually providing sealing, wherein the pump housing 40 comprises an inlet 50 and outlet 51 for sausage meat, between which a compression sector 52 and a dosing sector 53 can be realised. The inlet 50 is connected to the outlet 13 of the vacuum hopper 1. In the compression sector 52 the interior wall 42, for example in this embodiment, changes its distance to the pump shaft 41 such that the length of the vanes 43 shortens in the direction A of the compression space during the rotation of the rotor about the pump shaft 41, because the vanes are pushed in the direction towards the shaft 41 on the compression space side. If the rotor therefore moves in the direction of rotation A about the pump shaft 41, the volume of the chamber 8a is reduced in the compression sector 52. In the dosing sector 53 the chamber volume remains constant during the rotation of the rotor about the shaft 41 so that a defined dosing volume is produced. In the outlet sector 59 the respective vane cell is connected to a vane cell outlet 51 through which the paste mass, for example, is pushed into the filling tube 15.

As already mentioned, in addition to the level control, the invention also facilitates the influence or control of the degree of evacuation of the mass flowing into the vacuum hopper 1. The inlet valve 3 on the inlet 7 is provided for this. Here, the valve 3 comprises the valve face 9 which is located at the end of the feed tube 8. The inlet 7 is here provided in the upper section, i.e. in the upper third of the vacuum hopper 1. The feed tube 8 protrudes into the vacuum hopper, wherein in this embodiment the open end of the feed tube 8 faces upwards. Furthermore, an appropriate seal, sealing ring, etc. can be arranged at the upper end of the feed tube 8. The inlet valve 3 also comprises the baffle 5, which is situated opposite the valve face 9 of the feed tube 8. The baffle 5 is joined via the bar 17 to the drive 4 which can move the baffle 5 in the arrow direction F upwards and downwards along the central axis M of the inlet valve 3. The central axis M of the valve 3 runs essentially parallel to the central axis D of the vacuum hopper 1. The drive 4 comprises a motor, for example a stepper motor, which is controlled by a controller or closed-loop control device 22 shown in FIG. 6) and which sets the position of the baffle 5. With the valve open an inlet gap S is therefore produced between the valve face 9 on the upper end of the filling tube 8 and the oppositely located lower edge of the baffle 5. The sausage meat or paste mass fed via the filling tube 8 then enters the vacuum hopper 1 via the circumferential inlet gap S.

The valve geometry is preferably designed such that the inlet gap S exhibits the longest possible length, i.e. such that the filling tube exhibits the largest possible diameter or largest possible circumference. This facilitates the inlet gap S having a relatively low height h. Preferably the inlet gap S exhibits a circular or oval or elliptical cross-sectional geometry, but other cross-sectional geometries are also conceivable. Thus a relatively thin mass cross-section is produced in the inflow section. This means that all the enclosed air content is near to the surface and can thus be easily opened up and drawn off.

Thus, the extent of evacuation can be influenced via the height h of the inlet gap S. As can be seen from FIG. 1, the baffle 5 exhibits a larger diameter than the feed tube 8 in the region of the valve face 9, so that the end sections of the baffle 5 protrude over the valve face 9. Preferably the baffle 5 is formed such that the entering sausage meat is diverted downwards, i.e. to the outlet 13 of the vacuum hopper 1. Through the special shape of the baffle 5, especially with less viscous filling masses, the filling level is better controlled, because the sausage meat does not splash so much on the lid and the hopper wall on entering the hopper. As is apparent, for example, from FIGS. 1 and 2, the baffle 5 also has, on the side facing the valve face, a recess 6 which at least in the outer region of the inlet gap S exhibits a section A which slopes diagonally outwards and downwards from the central axis M. This sloping section diverts the mass downwards. The sloping section A should be provided, at least in the region which borders the inlet gap from outside (between the underside of the baffle and the valve face 9), but must not however, as can be seen from FIG. 1, extend completely to the outer edge of the baffle 5.

Figure 2:
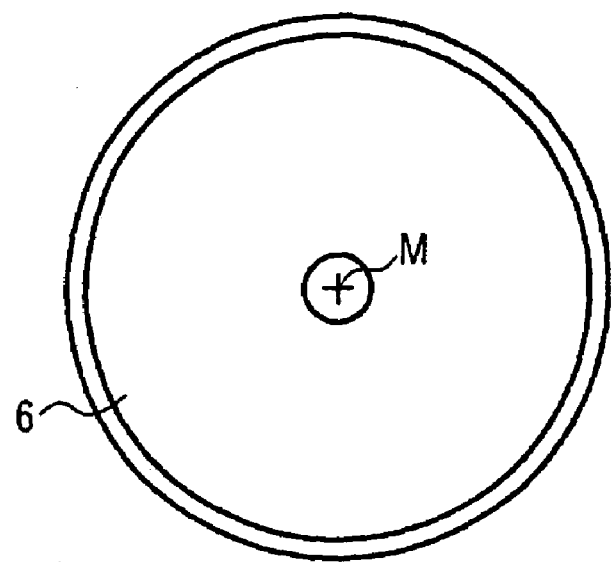
FIG. 2 shows a plan view of a baffle of an inlet valve according to the disclosure.

FIG. 2 shows a plan view of the baffle 5 illustrated in FIG. 1, wherein the recess 6 can be clearly seen which here extends in a ring shape about the central axis M of the valve.

Figure 3:
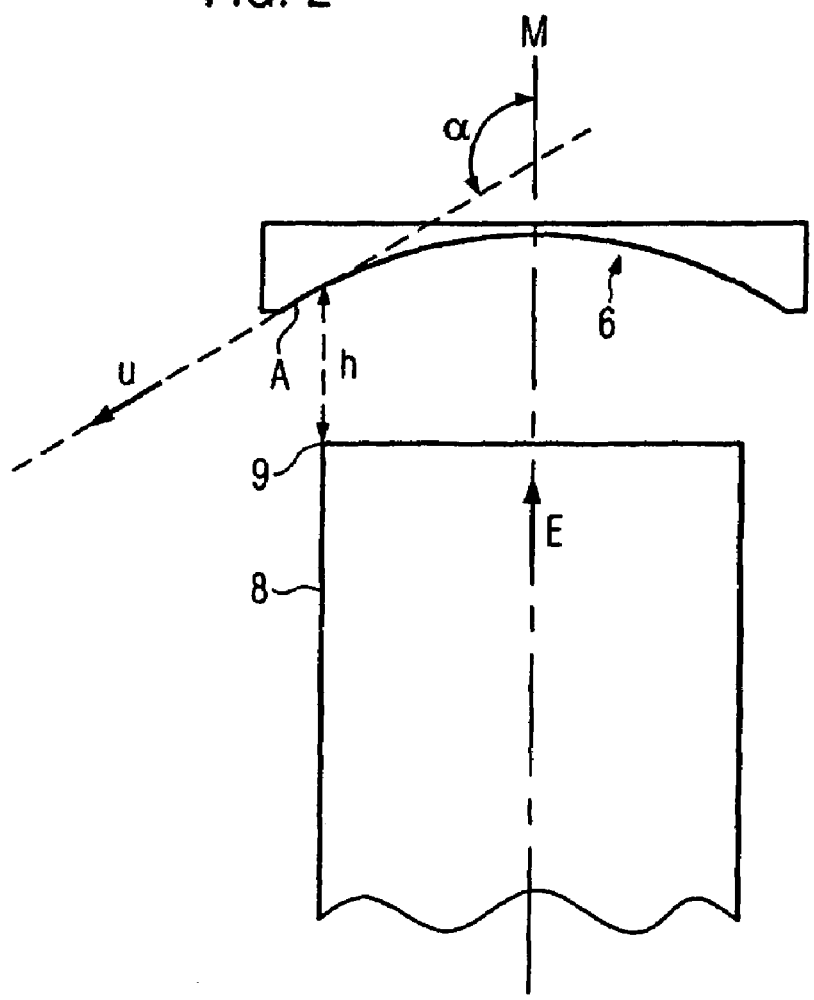
FIG. 3 shows in a schematic manner a cross-section of another embodiment of a baffle of the inlet valve according to the disclosure.

The shape is however not restricted to the shape of the recess 6 illustrated in FIG. 1. For example as illustrated in FIG. 3, also a concave shaped recess 6 can be formed in the baffle 5 which essentially runs rotationally symmetrically to the central axis M. As can, for example, be clearly seen in FIG. 3, the recess 6 comprises a section A which here slopes at about 130° with respect to the inlet direction E, i.e. to the central axis M, thus diverting the inflowing mass downwards. The section A should be sloped at an angle of approximately 100-180° with respect to the central axis M or to the inlet direction E in order to realise an appropriate diversion.

According to the disclosure the height h of the inlet gap S is controlled such that depending on various parameters the inlet gap S is maintained only so large as necessary for the level control and at the same time so small as possible for the closed-loop control of the evacuation. This is resolved by a minimum gap control. At least one of the following group can be considered as parameter for the control: compressibility or air content of the paste mass before the inlet valve, compressibility or air content of the paste mass after the outlet 13, e.g. on the outlet of the conveying mechanism 14, filling capacity of the paste mass from the reservoir into the vacuum hopper 1, amounts of charges of paste mass, pressure difference before and after the inlet valve 3, filling level, viscosity of the paste mass, temperature of the mass, etc.

For the measurement of the pressure difference before and after the inlet valve 3 appropriate pressure sensors 18 can be provided before the inlet valve 3 or 19 in the vacuum hopper 1. To determine the filling level in the vacuum hopper an appropriate level sensor 21 can be provided in the vacuum hopper 1. An ultrasonic sensor, mechanical level transmitter or a capacitive or optical sensor, for example, can be used as the level sensor which either gives the exact filling level or whether the filling level is in the permissible range. To determine the air content which is almost proportional to the compressibility of the paste mass, for example, a device 16 for the measurement of the compressibility can be provided in the conveying mechanism 14. A device for the measurement of the compressibility 62, 61 can also be provided before the inlet valve 3 or in the hopper (1). In FIG. 5, 16 represents a device for the measurement of the compressibility. The function of a compressibility sensor is, for example, explained in more detail in EP 1040758 B1. As already mentioned, the volume is changed in the chambers 46 for the compaction of the paste mass. The device 16 thus comprises a pressure sensor, which acquires the change of pressure in the volume-modifying chamber, wherein also the exact change of volume is acquired from which the compressibility can be calculated. Of course, other known devices for the measurement of the compressibility can also be used.

The previously quoted measurement devices, such as the devices for the measurement of the compressibility 16, the pressure sensors 18, 19 and the level sensor 21 can be connected to the closed-loop control device 22 which then in turn controls the setting of the inlet gap S.

The filling capacity (i.e. the filled quantity over time) of the paste mass from the reservoir into the vacuum hopper 1 can, for example, be determined from the following parameters and can also be passed to the control device 22. Height h of the opening gap S, time duration $\Delta t$ ($\Delta t = t_1 - t_2$), filling level at the time $t_1$, filling level at the time $t_2$.

As can be seen from the above description, the gap height h of the inlet valve 3 can be controlled depending on various parameters such that both the filling level and also the evacuation of the paste mass can be closed-loop controlled. The closed-loop control here occurs using a minimum gap control, wherein the inlet gap S is maintained only so high as required for the level control and at the same time as small as possible for the control of the evacuation.

Figure 4:
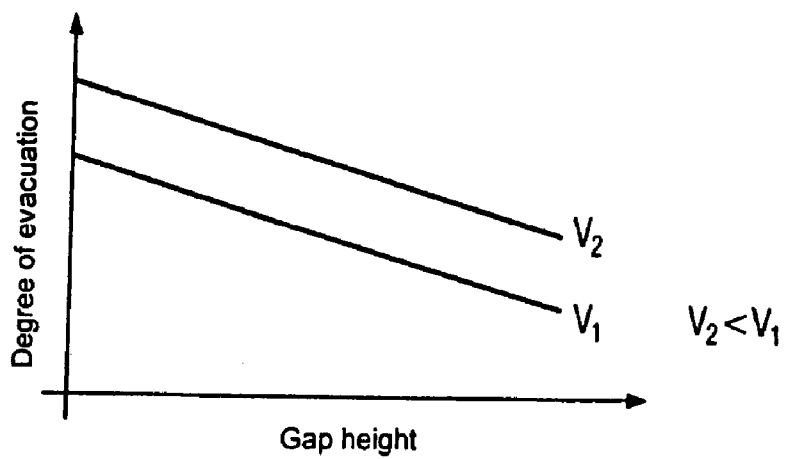
FIG. 4 shows the relationship between the gap height and degree of evacuation.

FIG. 4 shows schematically the relationship between the degree of evacuation and the gap height h. The degree of evacuation also depends on the conveying capacity and thus on the conveying speed $V_1$; $V_2$ of the mass into the hopper. Normally the degree of evacuation with a slow speed $V_2$ is higher then for a higher speed $V_1$. The degree of evacuation also depends on the negative pressure in the vacuum hopper and under some circumstances on the quality of the paste mass, i.e. on the interstratification in the paste mass.

If therefore the gap height h of the inlet gap S is controlled in dependence of the air content, that is in dependence of the compressibility of the paste mass (e.g. before the inlet valve 3 and/or after the outlet 13) and furthermore also in dependence of level parameters such as for example the filling capacity of the paste mass in the vacuum hopper 1 and/or the filling level in the vacuum hopper 1, this can occur using a closed-loop control circuit, wherein the controlled variables are for example the air content of the paste mass and the filling level and the final control element is the inlet valve 3. Thus a certain air content, for example 0.5 to 10%, can be set. The inlet gap S is however also controlled in terms of a minimum gap closed-loop control such that the filling level lies in a certain target filling level range.

Figure 6:
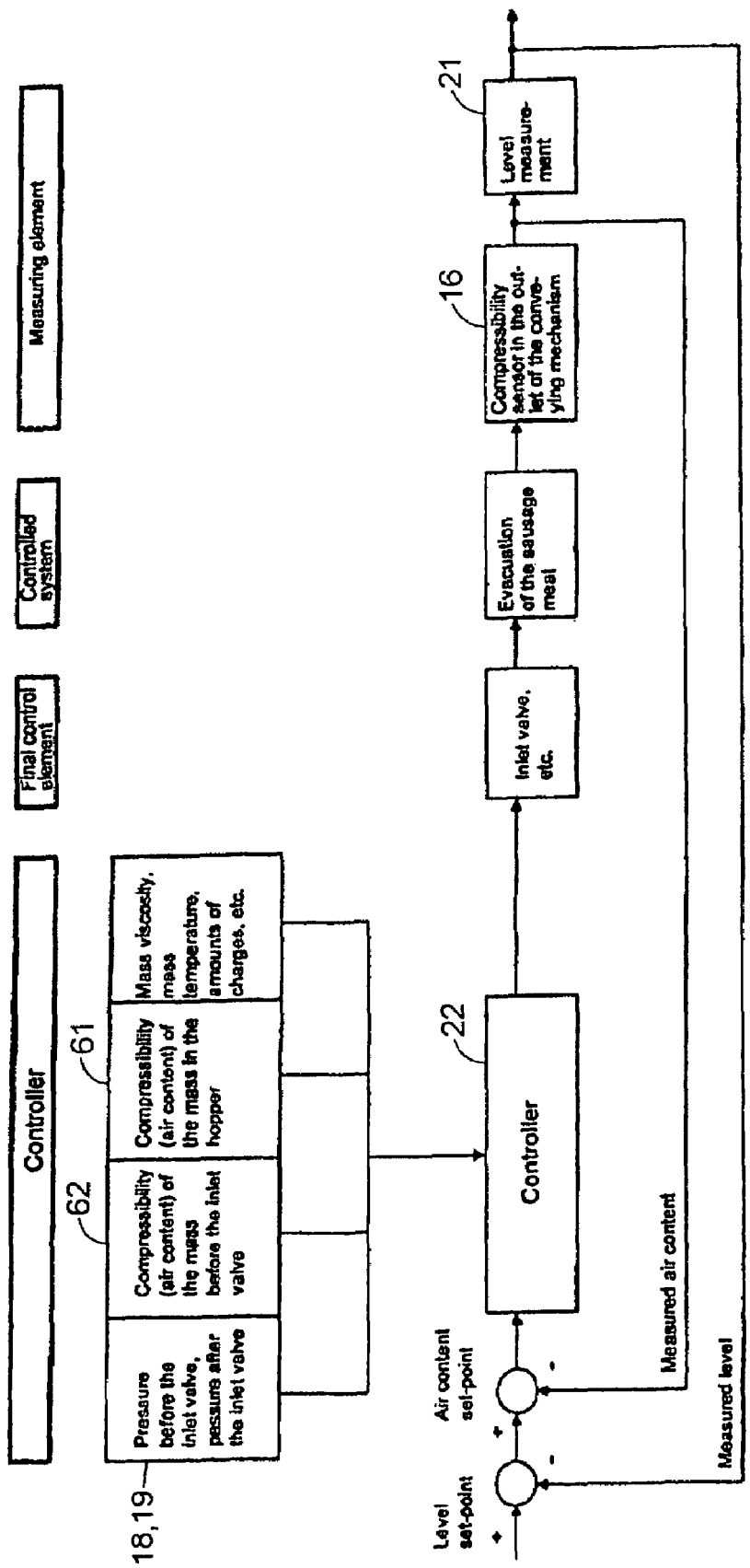
FIG. 6 shows schematically a block diagram of a closed-loop control circuit according to the disclosure.

The closed-loop control of the inlet gap S is explained in more detail in conjunction with FIG. 6, which illustrates a block diagram of an embodiment of a closed-loop control circuit according to the disclosure.

With the control circuit the controlled variables are the filling level and degree of evacuation, i.e. the air content or compressibility of the paste mass, and the final control element is the inlet valve. The controlled system is the evacuation of the sausage meat or the filling of the hopper. Measuring elements for the closed-loop control are the compressibility sensor and the level sensor. In this specific example the compressibility is measured in the outlet of the conveying mechanism 14 for the control. The closed-loop control device, i.e. the controller, compares the actual and set-point values of the respective controlled variables and sets the inlet gap height h in dependence of the actual/set-point comparison in order to set a certain air content per unit volume in the paste mass and to also maintain the correct filling level. In addition further parameters can influence the control, such as for example the pressure before the inlet valve or the pressure after the inlet valve, the compressibility of the mass before the inlet valve, the compressibility of the mass in the hopper, the viscosity of the mass, temperature of the mass, amounts of charges, etc. The previously mentioned parameters can either be determined as previously described using the appropriate measurement devices, wherein their values are then passed to the controller or however entered.

The control or closed-loop control device 22 is for this connected to an input device with which, for example, the various set-point values for the air content or compressibility, filling capacity, filling level, pressure in the vacuum hopper 1 and the pressure before the inlet valve 3, the pressure in the outlet and properties such as for example the temperature and quality of the paste mass can be entered.

The block diagram illustrated in FIG. 6 only shows one example of a closed-loop control according to the disclosure and is in no way restricted to this. With the disclosure it is only essential that the inlet valve is the final control element for a closed-loop control of the degree of evacuation of the paste mass, i.e. for a certain air content in the paste mass or of the corresponding compressibility.

We claim:

1. Vacuum hopper for sausage production comprising
   an inlet for feeding paste mass to the hopper;
   an outlet for ejecting the paste mass; and
   an inlet valve, which is arranged at the inlet, wherein a negative pressure can be produced in the vacuum hopper; and wherein,
   in an open state, the inlet valve forms an inlet gap for the paste mass, and a gap height of the inlet gap in the open state being closed-loop controlled to influence the degree of evacuation of the paste mass.

2. Vacuum hopper according to claim 1, wherein the hopper also comprises a closed-loop control device for controlling the gap height in dependence of at least one parameter from the following group:
   compressibility or air content of the paste mass before the inlet valve, compressibility or air content of the paste mass after the outlet or in the vacuum hopper, conveying capacity of a conveying mechanism arranged following the outlet, amounts of charges of the paste mass, pressure difference before and after the inlet valve, filling capacity of the paste mass in the vacuum hopper, filling level of the paste mass in the vacuum hopper, temperature of the paste mass, and viscosity of the paste mass.

3. Vacuum hopper according to claim 1, and wherein the vacuum hopper also comprises a closed-loop control device for the control of the gap height in dependence of one of the compressibility or of the air content of the paste mass one of before the inlet valve, after the outlet, or between the inlet valve and outlet, as well as in dependence of filling level parameters.

4. Vacuum hopper according to claim 1, wherein the inlet gap exhibits one of a circular, elliptical, or other closed cross-section.

5. Vacuum hopper according to claim 1, wherein the valve at the inlet comprises a valve face and a baffle situated opposite the valve face, wherein the distance between the valve face and the baffle gives the gap height.

6. Vacuum hopper according to claim 5, wherein the baffle is formed such that the paste mass is diverted one of downwards or diagonally downwards in the direction of the outlet.

7. Vacuum hopper according to claim 6, wherein the recess comprises one of a concave shape or a ring shape about the central axis of the valve.

8. Vacuum hopper according to claim 6, wherein the diversion of the paste mass is diagonally downwards in the direction of the outlet.

9. Vacuum hopper according to claim 5, wherein the baffle is formed such that on the side facing the valve face the baffle comprises a recess, which, at least in the outer region of the inlet gap, comprises a section sloping downwards from the central axis of the valve.

10. Vacuum hopper according to claim 9, wherein the section slopes diagonally downwards from the central axis of the valve.

11. Vacuum hopper according to claim 5, wherein the inlet is formed in the upper region of the vacuum hopper in the shape of a feed tube, the open end of which protrudes into the vacuum hopper and faces upwards, wherein the baffle is situated opposite the open end.

12. Vacuum hopper according to claim 1, wherein the valve comprises a drive for the baffle for setting the gap height.

13. Vacuum hopper according to claim 12, wherein the diameter of the baffle is larger than the diameter of the valve face.

14. Vacuum hopper according to claim 1, wherein a device for the determination of one of the compressibility of the paste mass or of the air content is arranged one of before the inlet valve or after the outlet of the vacuum hopper.

15. Vacuum hopper according to claim 1, wherein a level sensor is arranged in the vacuum hopper.

16. Vacuum hopper according to claim 1, and a pressure sensor is provided before and after the inlet valve.

17. Vacuum filler with a vacuum hopper according to claim 1, further comprising
a conveying mechanism, which ejects the paste mass out of the outlet of the vacuum hopper and pushes it into a filling tube in order to fill sausages with the paste mass; and
a vacuum pump for producing a negative pressure in one of the conveying mechanism or in the vacuum hopper.

18. Method of closed-loop level control and controlled evacuation of paste mass, comprising:
feeding of paste mass into a vacuum hopper via an inlet valve;
ejection of the paste mass via an outlet of the vacuum hopper, wherein a negative pressure is produced in the vacuum hopper; and
closed-loop controlling of a height of an inlet gap of an opened inlet valve for influencing the degree of evacuation of the paste mass.

19. Method according to claim 18, and ejecting the paste mass
from the outlet with the aid of a conveying mechanism, and the conveying mechanism pushing the paste mass into a filling tube for filling sausages.

20. Method according to claim 18, and controlling the gap height in dependence of one of the compressibility or of the air content of the paste mass one of before the inlet valve, after the outlet of the vacuum hopper, or between the inlet valve and the outlet, and in dependence of filling level parameters.

21. Method according to claim 18, and controlling the gap height (h) in dependence of at least one of the following parameters:
compressibility or air content of the paste mass before the inlet valve, compressibility or air content of the paste mass after the outlet or in the vacuum hopper, filling capacity of the paste mass in the vacuum hopper, amounts of charges of the mass, pressure difference before and after the inlet valve, filling level, conveying capacity of a conveying mechanism arranged at the outlet, temperature of the paste mass, or viscosity of the paste mass.

22. Method according to claim 18, and carrying out a closed-loop gap control for the control of the gap height of the inlet gap, wherein the inlet gap is set such that it is as large as necessary for the level control and is as small as required for the closed-loop control of the degree of evacuation.

23. Inlet valve for the controlled entry of paste mass into a vacuum hopper, comprising a baffle situated opposite a valve face to define an inlet gap, wherein the baffle is formed such that the paste mass is diverted in a direction one of opposite or diagonal to an inlet direction of the paste mass, and wherein the baffle is formed such that it comprises a recess which at least in the outer region of the inlet gap comprises a section sloping from a central axis of the inlet valve diagonally or oppositely from the inlet direction.

24. Inlet valve according to claim 23, wherein the baffle diverts the paste mass at an angle in the range of approximately 100° to 180° with respect to the inlet direction or central axis of the valve.

25. Inlet valve according to claim 24, wherein the baffle is formed such that the baffle has a larger diameter than a valve face.

26. Inlet valve according to claim 23, wherein the baffle is formed such that on the side facing the valve face the baffle comprises a recess, which, at least in the outer region of the inlet gap, comprises a section sloping diagonally outwards from the central axis.

27. Inlet valve according to claim 23, wherein the recess one of exhibits an essentially concave shape or runs in a ring shape about the central axis of the valve.

* * * * *